(12) United States Patent
Seth et al.

(10) Patent No.: US 10,489,566 B2
(45) Date of Patent: Nov. 26, 2019

(54) AUTOMATED USER PROFILE GENERATION AND AUTHENTICATION

(71) Applicant: Microsoft Technology Licensing, LLC, Redmond, WA (US)

(72) Inventors: Manav Seth, Bothell, WA (US); Alexandros Lancaster, Seattle, WA (US); Shanna X. Chen, Seattle, WA (US); Kota Ito, Sammamish, WA (US); Artur Upton Renault, New York, NY (US); Shreyans Rai Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 15/457,445

(22) Filed: Mar. 13, 2017

(65) Prior Publication Data

US 2018/0260543 A1 Sep. 13, 2018

(51) Int. Cl.
*G06F 21/31* (2013.01)
*H04L 29/06* (2006.01)

(52) U.S. Cl.
CPC ............ *G06F 21/316* (2013.01); *G06F 21/31* (2013.01); *H04L 63/08* (2013.01); *H04L 63/101* (2013.01)

(58) Field of Classification Search
CPC ....... G06F 21/316; G06F 21/31; H04L 63/08; H04L 63/101
See application file for complete search history.

(56) References Cited

U.S. PATENT DOCUMENTS

| 8,892,461 | B2 | 11/2014 | Lau et al. |
| 8,949,273 | B2 | 2/2015 | Main |
| 8,972,400 | B1 * | 3/2015 | Kapczynski ........... G06Q 10/06 707/732 |

(Continued)

OTHER PUBLICATIONS

Cheng, et al., "Bind your Phone Number with Caution: Automated User Profiling Through Address Book Matching on Smartphone", In Proceedings of the 8th ACM SIGSAC symposium on Information, Computer and Communications Security, May 8, 2013, pp. 335-340.

(Continued)

*Primary Examiner* — Nelson S. Giddins
(74) *Attorney, Agent, or Firm* — Michael Best & Friedrich LLP

(57) ABSTRACT

Systems and methods for automatic user profile generation and authentication. One system includes a database storing user profile data for a plurality of users and an electronic processor communicatively coupled to the database. The electronic processor is configured to receive, from a computing device, a first usage indicator for a first user and a first user identifier for the first user, and to generate a probable user profile based on the first usage indicator and the first user identifier. The electronic processor is configured to retrieve, from the database, a plurality of previously-generated user profiles, and to determine, for each of the previously-generated user profiles, a confidence score based on the probable user profile. The electronic processor is configured to select an active user profile from the plurality of previously-generated user profiles when the confidence score exceeds a confidence threshold, and transmit, to the computing device, the active user profile.

14 Claims, 4 Drawing Sheets

(56) References Cited

U.S. PATENT DOCUMENTS

| | | | |
|---|---|---|---|
| 9,152,529 B2 | 10/2015 | George et al. | |
| 9,185,095 B1 | 11/2015 | Moritz et al. | |
| 9,392,460 B1* | 7/2016 | Blake | H04W 4/029 |
| 9,398,143 B1 | 7/2016 | Fullmer et al. | |
| 10,083,160 B1* | 9/2018 | Yu | G06F 16/9558 |
| 2003/0093794 A1 | 5/2003 | Thomas et al. | |
| 2007/0006163 A1* | 1/2007 | Aoki | G06F 21/31 |
| | | | 717/127 |
| 2007/0130343 A1* | 6/2007 | Pardo-Blazquez | H04L 29/12122 |
| | | | 709/227 |
| 2011/0035256 A1* | 2/2011 | Shkedi | G06Q 30/02 |
| | | | 705/7.29 |
| 2011/0125770 A1* | 5/2011 | Battestini | G06Q 10/00 |
| | | | 707/758 |
| 2011/0145039 A1* | 6/2011 | McCarney | G06Q 10/06311 |
| | | | 705/7.32 |
| 2013/0340034 A1* | 12/2013 | Rich | G06F 21/74 |
| | | | 726/1 |
| 2014/0195530 A1* | 7/2014 | Milton | G06Q 30/02 |
| | | | 707/734 |
| 2015/0169774 A1* | 6/2015 | Budzienski | G06Q 50/01 |
| | | | 707/734 |
| 2016/0070453 A1* | 3/2016 | Felt | G06F 3/04847 |
| | | | 715/771 |
| 2016/0170967 A1* | 6/2016 | Allen | G10L 25/63 |
| | | | 704/9 |
| 2017/0039242 A1* | 2/2017 | Milton | G06Q 30/0269 |
| 2017/0070510 A1* | 3/2017 | Ramalingam | H04L 63/08 |
| 2017/0177808 A1* | 6/2017 | Irwin | G06F 19/328 |
| 2017/0369071 A1* | 12/2017 | Gould | B60R 16/037 |
| 2018/0039773 A1* | 2/2018 | Levi | H04L 67/306 |
| 2019/0012747 A1* | 1/2019 | Antonelli | G06Q 10/06312 |

OTHER PUBLICATIONS

Iglesias, et al., "Creating Evolving User Behavior Profiles Automatically", In Journal of IEEE Transactions on Knowledge and Data Engineering, vol. 24, Issue 5, May 2012, pp. 854-867.

Peacock, et al., "Typing Patterns: A Key to User Identification", In Journal of IEEE Security & Privacy, vol. 2, Issue 5, Sep. 2004, pp. 40-47.

"International Search Report & Written Opinion Issued in PCT Application No. PCT/US2018/020996", dated Jun. 6, 2018, 10 Pages.

* cited by examiner

AUTOMATED USER PROFILE GENERATION AND AUTHENTICATION

FIELD

Embodiments described herein relate to user profiles, and, more particularly, to automatically generating and detecting user profiles.

SUMMARY

Software applications, such as the Office® suite of productivity applications provided by Microsoft Corporation, may be used by users on different devices at different points in time. Such applications are customizable for a user, based on the user's preferences. Customizable settings include, for example, toolbar and other control layouts, graphical themes, document formatting preferences, spell check preferences, customized dictionaries, and the like. Computing device operating systems, such as the Windows® family of operating systems provided by Microsoft Corporation, also feature user-customizable settings. A user's preferred settings may be saved on one or more devices (for example, in a configuration file or an operating system registry). However, changing settings on one device may not change settings on all devices.

User profiles are sometimes used to address this concern. A profile is a collection of settings associated with a user. User profiles may also include security settings (for example, file permissions), device preferences (for example, network settings), or personal information (for example, name, email addresses, phone numbers, and the like) for the user. A profile is associated with a user account. When a user logs in using his or her user account, the settings stored in the profile are applied to the operating system and applications. However, user account creation takes time and increase "user friction." User friction is caused by processes that slow down, degrade, or complicate the user experience with a computing device or a software application. Increased user friction can cause some users to avoid creating accounts or abandon use of an application during the sign-up process. In some instances, user friction is increased when users forget or lose their user account credentials. In other instances, the user account associated with the user profile may be inaccessible on a particular device. For example, a user profile associated with a network login may not be accessible on a mobile computing device.

Thus, embodiments described herein provide, among other things, systems and methods that allow a user to begin working on documents quickly without the need to first create a profile or account, and in some instances for automatically generating user profiles. For example, when a user begins using an application, the systems and methods may collect usage indicators and user identifiers, generate a probable user profile, and select an active profile from a plurality of previously-generated profiles based on the probable user profile and a confidence score.

For example, one embodiment provides a system for automatic profile generation and authentication. The system includes a database storing user profile data for a plurality of users and an electronic processor communicatively coupled to the database. The electronic processor is configured to receive, from a computing device, a first usage indicator for a first user. The electronic processor is configured to receive, from the computing device, a first user identifier for the first user. The electronic processor is configured to generate a probable user profile based on the first usage indicator and the first user identifier. The electronic processor is configured to retrieve, from the database, a plurality of previously-generated user profiles. The electronic processor is configured to determine, for each of the plurality of previously-generated user profiles, a confidence score based on the probable user profile. The electronic processor is configured to select an active user profile from the plurality of previously-generated user profiles when the confidence score exceeds a confidence threshold. The electronic processor is configured to transmit, to the computing device, the active user profile.

Another embodiment provides a method for automatic profile generation and authentication. The method includes receiving, from a computing device, a first usage indicator for a first user. The method includes receiving, from the computing device, a first user identifier for the first user. The method includes generating, with an electronic processor, a probable user profile based on the first usage indicator and the first user identifier. The method includes retrieving, from a database storing user profile data for a plurality of users, a plurality of previously-generated user profiles. The method includes determining, for each of the plurality of previously-generated user profiles, a confidence score based on the probable user profile. The method includes selecting, from the plurality of previously-generated user profiles, a first plurality of potential matches based on at least one selected from a group consisting of the first usage indicator and the first user identifier. The method includes selecting, an active user profile from the first plurality of potential matches when the confidence score exceeds a confidence threshold. The method includes transmitting, to the computing device, the active user profile.

Another embodiment provides a non-transitory computer-readable medium including instructions executable by an electronic processor to perform a set of functions. The set of functions includes receiving, from a computing device, a first usage indicator for a first user; receiving, from the computing device, a first user identifier for the first user. The set of functions includes generating, with an electronic processor, a probable user profile based on the first usage indicator and the first user identifier. The set of functions includes retrieving, from a database storing user profile data for a plurality of users, a plurality of previously-generated user profiles. The set of functions includes determining, for each of the plurality of previously-generated user profiles, a confidence score based on the probable user profile. The set of functions includes selecting, from the plurality of previously-generated user profiles, a first plurality of potential matches based on at least one selected from a group consisting of the first usage indicator and the first user identifier. The set of functions includes selecting an active user profile from the first plurality of potential matches when the confidence score exceeds a confidence threshold. The set of functions includes transmitting, to the computing device, the active user profile

DETAILED DESCRIPTION

Figure 1:
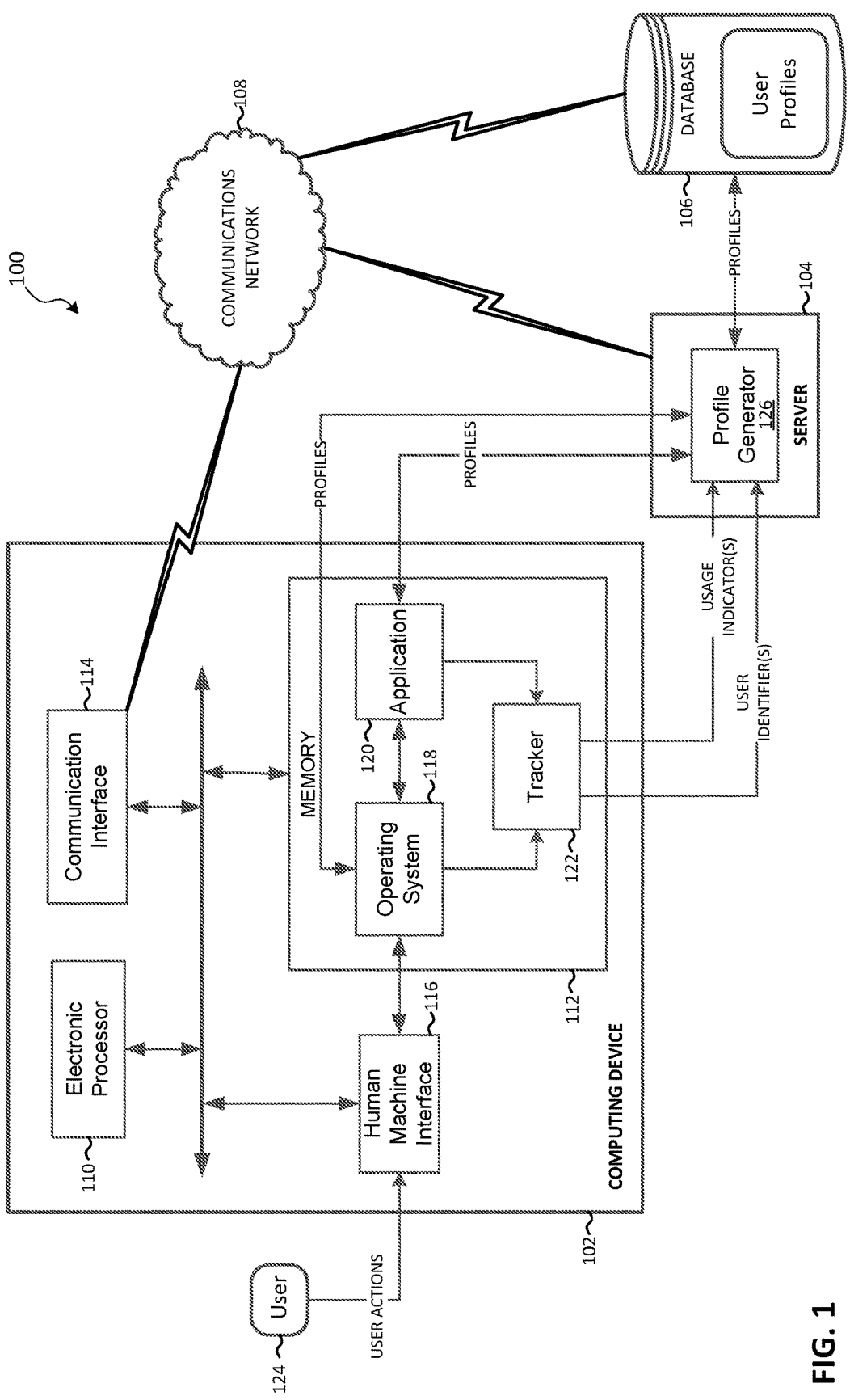
FIG. 1 schematically illustrates a system for automatic user profile generation and authentication according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as non-transitory, computer-readable media storing instructions executable by one or more electronic processor to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, user profile and account creation increases user friction, and may lead to a poor user experience. For example, a user may not want to spend time creating a user account or profile, a user may forget or lose his or her account credentials, or the user account may be inaccessible or inapplicable to the computing device the user is attempting to use.

Accordingly, embodiments described herein automatically generate a user profile based on information about the user and how the user interacts with a computing device or application during a user session. In some embodiments, the automatically generated profile is stored and retrieved (for example, in and from an electronic database) automatically by comparing user interactions and user information gathered during a subsequent user session to one or more previously-generated profiles. Thus, the user may operate an application or system using his or her user information and preferred settings (stored in a user profile), without first creating or authenticating to a user account.

FIG. 1 schematically illustrates a system 100 for automatic user profile generation and authentication. In the example illustrated in FIG. 1, the system 100 includes a computing device 102, a server 104, and a database 106. It should be understood that the system 100 is provided as an example and, in some embodiments, the system 100 may include additional components. For example, the system 100 may include multiple computing devices 102, multiple servers 104, multiple databases 106, or a combination thereof.

The computing device 102 and the server 104 are communicatively coupled via a communications network 108. The communications network 108 may be implemented using a wide area network, such as the Internet, a local area network, such as a Bluetooth™ network or Wi-Fi, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

The computing device 102 is a personal computing device (for example, a desktop computer, a laptop computer, a terminal, a tablet computer, a smart telephone, a wearable device, or the like). The computing device 102 includes an electronic processor 110 (for example, a microprocessor, application-specific integrated circuit (ASIC), or another suitable electronic device), a memory 112, a communication interface 114, such as a transceiver, for communicating over the communications network 108 and, optionally, one or more additional communication networks or connections, and a human machine interface 116. The electronic processor 110, the memory 112, the communication interface 114, and the human machine interface 116 are communicatively coupled over one or more communication lines or buses, wirelessly, or a combination thereof. It should be understood that the computing device 102 may include additional components than those illustrated in FIG. 1 in various configurations and may perform additional functionality than the functionality described in the present application.

The memory 112 includes a non-transitory, computer-readable storage medium. As used herein, the term "non-transitory computer readable medium" comprises all computer-readable media except for a transitory, propagating signal. Accordingly, a non-transitory computer-readable medium may include, for example, a hard disk, a CD-ROM, an optical storage device, a magnetic storage device, a ROM (Read Only Memory), a RAM (Random Access Memory), a register memory, a processor cache, or any combination thereof.

The electronic processor 110 is configured to retrieve from the memory 112 and execute, among other things, software related to the control processes and methods described herein. For example, as illustrated in FIG. 1, the memory 112 stores an operating system 118, an application 120, and a tracker 122. The operating system 118 may be, for example, one of the Windows® family of operating systems provided by Microsoft Corporation. The application 120 is a software application executed by the electronic processor 110, which allows a user (for example, the user 124) to create and edit documents. In some embodiments, the application 120 is one of the Microsoft Office® suite of applications (for example, Outlook®, Word®, Excel®, PowerPoint®, and the like). Alternative embodiments execute more than one application 120. As described more particularly below, in some embodiments, the tracker 122 generates usage indicators and user identifiers from information received from the operating system 118, the application 120, or both.

The human machine interface (HMI) 116 receives input from, and provides output to, users (for example, the user 124) of the computing device 102. The HMI 116 may include a keyboard, mouse, and a display (for example, a touchscreen). The HMI 116 communicates with the operating system 118 to send and receive data to and from the operating system 118 and the application 120.

The server 104 includes a profile generator 126. As described more particularly below, in one embodiment, the profile generator 126 receives usage indicators and user identifiers from the tracker 122, generates user profiles, and sends and receives user profiles to and from the operating system 118, the application 120, and the database 106.

As illustrated in FIG. 1, to provide the services described herein, the server 104 may communicate with the database 106. The database 106 may be a database housed on a suitable database server communicatively coupled to and accessible by the server 104. In alternative embodiments, the database 106 is part of a cloud-based database system external to the system 100 and accessible by the server 104 over one or more additional networks. Also, in some embodiments, all or part of the database 106 is locally stored on the server 104 (for example, within the storage device 204).

In some embodiments, as illustrated in FIG. 1, the database 106 electronically stores user profile data. It should be understood that, in some embodiments, the data stored in the database 106 is distributed among multiple databases that communicate with the server 104. The user profile data includes user profiles, which are unique to and associated with individual users of the computing device 102. For example, the user profiles may include user account information, security permissions, (for example, file or application permissions), device preferences (for example, network settings), application settings or preferences (for example, toolbar and other control layouts, graphical themes, document formatting preferences, spell check preferences, customized dictionaries, and the like), or personal information (for example, name, email addresses, phone numbers, and the like) for the user.

A user profile may also include one or more usage indicators and one or more user identifiers, which may be used to match a user to his or her profile. As used herein, the terms "profile identifier" and "profile identifiers" may be used to refer to usage indicators, user identifiers, or both collectively. In some embodiments, profile identifiers are generated by the tracker 122. In other embodiments, the tracker 122 retrieves profile identifiers are by querying a database or accessing a settings file or registry. In other embodiments, profile identifiers are transmitted to the tracker 122 via a system or application message. As described in detail below, in some embodiments, the tracker 122 is a software application that generates usage indicators and user identifiers.

Usage indicators are indicators of how a user (for example, the user 124) interacts with the computing device 102. In some embodiments, the tracker 122 generates usage indicators from data about user actions received or retrieved from the operating system 118, the application 120, or both. User actions include actions received (for example, via the HMI 116) as the user 124 interacts with the operating system 118 (for example, by manipulating graphical user interface elements, opening and closing applications and documents, and the like) and the application 120 (for example, by entering data into documents, using application features, and the like).

In some embodiments, a usage indicator may be a typing pattern. For example, a particular user may type a particular combination of letters in rapid succession, while typing other combinations more slowly. Other examples of typing patterns include whether a user uses the caps lock key or the shift key to generate capital letters, how often a user uses the backspace key and how many spelling mistakes a user makes. The tracker 122 may use pattern recognition techniques to develop an overall typing pattern from two or more of the foregoing attributes.

In some embodiments, a usage indicator may be a language (English, German, French, Spanish, Chinese, Japanese, Arabic, and the like selected via a language setting of the the operating system 118. In some embodiments, a usage indicator may be a word usage (for example, what words a user enters most often, the diversity or complexity a user's vocabulary, and the like). In some embodiments, a usage indicator may be document content. Document content includes, for example, whether a particular word or words appears repeatedly in documents created or accessed by the user 124.

In some embodiments, a usage indicator may be a touch gesture pattern. The touch gesture patter may be based on, for example, frequently performed gestures, or a particular sequence of gestures. In some embodiments, a user identifier may be a mouse movement pattern. For example, a particular user may move the mouse pointer at one speed when scrolling and at another speed when dragging windows or icons.

In some embodiments, a usage indicator includes a document feature or features used when a document is created. For example, a user may create a document with a particular combination of fonts, font styles, margins, headers, footers, tabs, tables, charts, line spacing, headings, and the like. In another example, some users may use a feature or combination of features with greater frequency than others.

In some embodiments, a usage indicator may be a reading speed. For example, the tracker 122 may be able to determine how fast the user is reading a document by tracking at what speed or how often a user scrolls through a document, browser window, or other graphical user element presenting text information.

User identifiers are data, settings, and the like used to determine the identity of a user (for example, the user 124). In some embodiments, the tracker 122 generates user identifiers from data received or retrieved from the operating system 118, the application 120, user documents, or a combination of the foregoing.

In some embodiments, a user identifier is a name, an email address, a phone number, a date of birth, and the like. The user identifier may be retrieved from a user account, or provided by the user 124. In some embodiments, a user identifier includes a location received from a geolocation application, determined from a network connection, specified by the user 124, or obtained from another source.

In other embodiments, a user identifier is derived or determined based on an installed application or group of applications installed on the computing device 102 and other devices used by the user 124. The application or group of applications is used to differentiate the user 124 from other users, who do not have that application or group of applications installed. In some embodiments, a user identifier is or includes an interface customization (for example, a graphical user interface theme, desktop wallpaper, pointer size, pointer tracking speed, and the like). In other embodiments, a user identifier is or includes an email, a text message, a calendar entry, a contact record, and the like, or metadata extracted from one or more of the foregoing. The user identifier may be retrieved from a messaging application or contact database stored in the memory 112 of the computing device 102. In some embodiments, a user identifier determined based on a proximity to an authenticated device. For example, the computing device 102 may be located in the same room as one or more other devices that are authenticated to a network using the same user account. In some embodiments, a user identifier includes or is based on a network connection.

In some embodiments, a user identifier is or includes biometric data (for example, an iris scan, a fingerprint, a palm print, a facial-recognition-ready photograph, voice analysis data, an electrocardiogram, and the like.

In some embodiments, a user identifier includes or is based on information related to one or more nearby authenticated users. For example, the user 124 may be using the computing device 102 in proximity to several authenticated users that are part of a work group, increasing the likelihood that the user 124 is also a member of the same work group.

Figure 2:
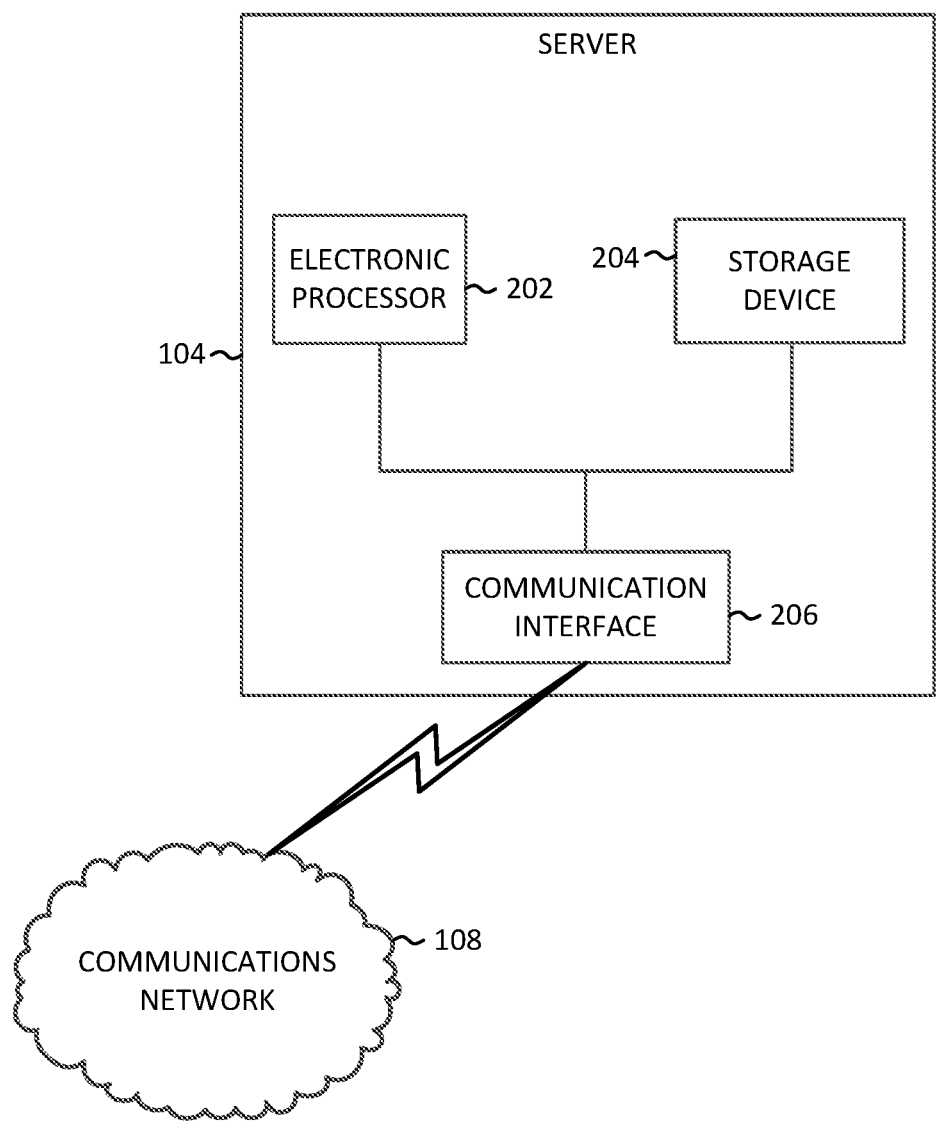
FIG. 2 schematically illustrates a server included in the system of FIG. 1 according to some embodiments.

FIG. 2 schematically illustrates the server 104 in more detail. In the example provided, the server 104 includes an electronic processor 202, a storage device 204, and a communication interface 206. The electronic processor 202, the storage device 204, and the communication interface 206 communicate over one or more communication lines or buses, wirelessly, or a combination thereof.

Figure 3:
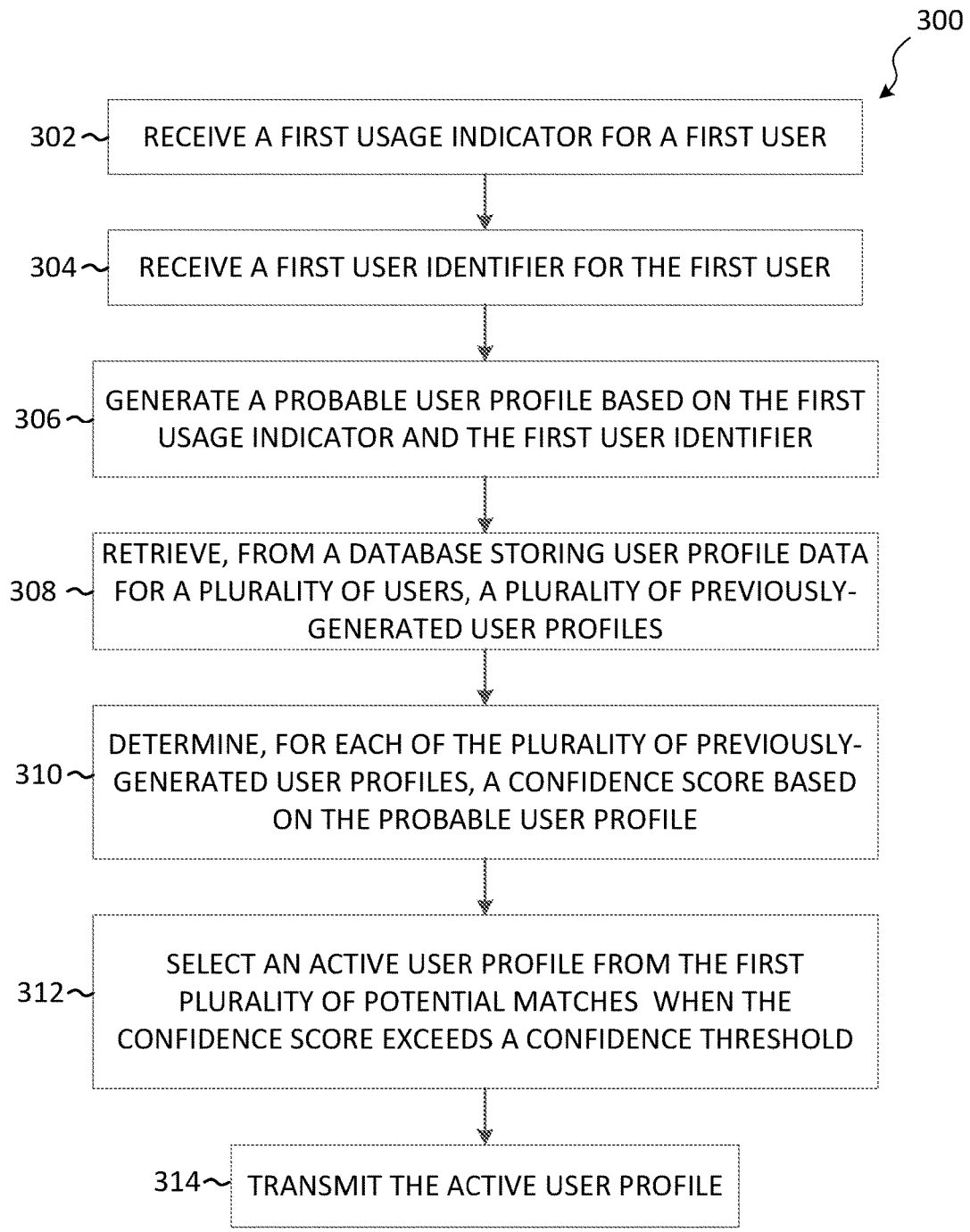
FIG. 3 is a flowchart illustrating a method of automatic user profile generation and authentication performed by the system of FIG. 1 according to some embodiments.

The electronic processor 202 may include a microprocessor, application-specific integrated circuit (ASIC), or another suitable electronic device. The storage device 204 includes a non-transitory, computer-readable storage medium. As illustrated in FIG. 2, the communication interface 206 may include a transceiver (for example, a Wi-Fi or Ethernet transceiver) for communicating over the communications network 108 and, optionally, one or more additional wired or wireless communication networks or connections. The electronic processor 202 is configured to retrieve from the storage device 204 and execute, among other things, software related to the processes and methods described herein. For example, FIG. 3 illustrates a method 300 for automatic user profile generation and authentication performed by profile generator 126 of the server 104 according to one embodiment. The method 300 is described as being performed by profile generator 126 of the server 104 and, in particular, the electronic processor 202. However, it should be understood that in some embodiments, portions of the method 300 may be performed by other devices, including for example, the computing device 102.

In some embodiments, the server 104 performs machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

As illustrated in FIG. 3, at block 302, the electronic processor 202 receives, from the computing device 102, a first usage indicator for a first user. In some embodiments, the electronic processor 202 receives multiple usage indicators. For example, at block 304, the electronic processor 202 receives, from the computing device 102, a first user identifier for the first user. In some embodiments, the electronic processor 202 receives multiple user identifiers. As noted above, the usage indicators and user identifiers may be generated, received, or otherwise determined by the tracker 122. In some alternative embodiments, the operating system 118, the application 120, or both may transmit one or more usage indicators and user identifiers directly to the profile generator 126.

At block 306, the electronic processor 202 generates a probable user profile based on the first usage indicator and the first user identifier. For example, the electronic processor 202 creates a database record that includes the usage indicators and user identifiers (received at blocks 302 and 304). As noted above, user profiles are unique to and associated with individual users of the computing device 102. As described in more detail below, the probable user profile may be compared to previously-generated user profiles, each of which are associate with a unique user, to determine which user is currently using the computing device 102.

At block 308, the electronic processor 202 retrieves, from the database 106, a plurality of previously-generated user profiles. The previously-generated user profiles may have been generated, for example, by the profile generator 126 using the methods described herein. Each previously-generated user profile is associated with a unique user and includes one or more of that user's preferences or settings for one or more applications (for example, the application 120), operating systems (for example, the operating system 118), or both. Each previously-generated user profile also includes profile identifiers for its associated user.

At block 310, the electronic processor 202 determines, for each of the plurality of previously-generated user profiles, a confidence score based on the probable user profile. In some embodiments a confidence score is a numerical representation (for example, from 0 to 1) of how closely the profile identifiers included in the probable user profile match the profile identifiers included in the previously-generated user profile. For example, a typing pattern in the probable user profile may be a 60% match with a typing pattern in a first previously-generated user profile, but may be an 80% match with a typing pattern in a second previously-generated user profile, resulting in confidence scores of 0.6 and 0.8, respectively. In some embodiments, individual confidence scores are determined for individual profile identifiers. The electronic processor 202 may sum, average, or otherwise process the individual scores to generate a composite confidence score for the previously-generated user profile. In some embodiments, the electronic processor 202 uses one or more machine learning algorithms (for example, a neural network) to determine the individual confidence scores, the composite confidence score, or both.

Optionally, in some embodiments, the electronic processor 202 assigns a weight to one or more of the profile identifiers. The weight is used to indicated a how significant a particular profile identifier is to identifying a user, relative to the other profile identifiers. Profile identifiers with a higher weight contribute more to the confidence score. For example, a smaller quantity of higher weighted user identifiers (for example, biometric data) may result in a higher confidence score than a larger quantity of lower-weighted usage indicators or user identifiers (for example, fonts or document features). In another example, one particular profile identifier (for example, a fingerprint match) may have a weight high enough to generate a profile match, regardless of the other profile identifiers present in the profile. In such embodiments, the electronic processor 202 determines, for each of the plurality of previously-generated user profiles, a weighted confidence score based on the confidence score and the weight. For example, the electronic processor 202 may multiply individual confidence scores by the weight assigned to the respective usage indicator or user identifier before determining an overall confidence score for the previously-generated user profile.

In some embodiments, the weights are determined using a machine learning algorithm (for example, a neural network or a classifier). Over time, as matches are determined for user profiles, the machine learning algorithm may determine that particular usage indicators or user identifiers are more determinative to a high confidence score than others, and thus increase the weight for those usage indicators or user identifiers. For example, if a high confidence score for a mouse movement pattern is involved in 70% of profile matches, the mouse movement pattern may be assigned a higher weight.

At block 312, the electronic processor 202 selects, for the first user, an active user profile from the plurality of previously-generated user profiles when the confidence score exceeds a confidence threshold. Optionally, in some embodiments, when a weighted confidence score is used, as described above, the electronic processor 202 selects, for the first user, an active user profile from the plurality of previously-generated user profiles when the weighted confidence score exceeds a confidence threshold. In one example, the confidence threshold is an absolute threshold (for example, a confidence score of at least 0.7 when the possible range is 0 to 1). In another example, the confidence threshold is a relative value indicative of how much higher one confidence score is from the next nearest confidence score, or above a median or average confidence score for the plurality of previously-generated user profiles. In some embodiments, the active user profile is one of the plurality of previously-generated user profiles having the highest confidence score.

In some instances, none (or too few) of the plurality of previously-generated user profiles have a confidence score exceeding the confidence threshold. Accordingly, in some embodiments, the electronic processor 202 repeats the steps in blocks 302 through 310. For example, as more profile identifiers are generated by the tracker 122 (for example, as the user 124 continues using the computing device 102) and received by the profile generator 126, the electronic processor 202 continues to update the probable user profile and determine new or updated confidence scores based on the updated probable user profile. In some embodiments, the electronic processor 202 repeats blocks 302 through 310 until at least one confidence score exceeds the confidence threshold.

In some embodiments, the electronic processor 202 uses profile identifiers, rather than of the whole profile, to narrow down the plurality of previously-generated user profiles under consideration. In such embodiments, the electronic processor 202 selects, from the plurality of previously-generated user profiles, a plurality of potential matches based on a usage indicator, a user identifier, or both. For example, when a user identifier is a location, previously-generated user profiles having other locations may be eliminated from consideration resulting in a plurality of potential matches having the same location value. In some embodiments, the confidence threshold for individual profile identifiers may be used to choose a plurality of potential matches. For example, when the confidence score for a typing pattern exceeds the confidence threshold for 10 out of 100 previously-generated user profiles, the electronic processor 202 includes those 10 previously-generated user profiles in the plurality of potential matches. In embodiments where potential matches are determined, the active user profile is selected from the plurality of potential matches (for example, when the confidence score exceeds a confidence threshold).

In some embodiments, because it can be inferred that one of the plurality of potential matches is the user's profile, the computing device 102 makes one or more personalized resources (for example, system or application settings) available to the user based on the plurality of potential matches. Non-private information (for example, desktop themes, font preferences, access to some documents, and the like) may be common to all profiles in the plurality of potential matches, and thus may be provided to the user.

In some embodiments, the electronic processor 202 continues narrowing the plurality of potential matches until the active profile is finally selected. The electronic processor 202 continues to receive, from the computing device, one or more of usage indicators and user identifiers, and generates updated confidence scores for each of the plurality of potential matches accordingly. In some embodiments, the electronic processor 202 selects, a second plurality of potential matches from the first plurality (for example, based on the updated confidence scores). In such embodiments, the electronic processor 202 selects the active user profile from the second plurality of potential matches based on the updated confidence score. In some embodiments, as the electronic processor 202 continues narrowing the plurality of potential matches, it provides more and more aspects of the user's eventual active profile (for example, based on non-private information common to the current plurality of potential matches) until the active profile is finally selected. Thus, the user is provided with a progressively more personalized experience.

Regardless of how the active user profile is selected, at block 314, the electronic processor 202 transmits to the computing device (for example, via the communications network 108), the active user profile.

In other embodiments, the electronic processor 202, determines whether a probable user profile has sufficient "information density" (that is, information of sufficient quantity or quality to allow for a meaningful comparison to an existing profile). For example, a probable user profile that contains only a font setting may match every other existing profile that includes the same font setting, and will likely not yield a unique match. In another example, a probable user profile that includes a typing pattern, a language, a location, and a particular combination of features, and biometric data for the user will be more likely to yield a unique match. In some embodiments, the electronic processor 202, determines an information quality score for the probable user profile. The information quality score is a numeric value (for example, from 0 to 100) representing the information density of the probable user profile. In some embodiments, the information quality score is weighted (for example, based on weights assigned to the profile identifiers). For example, a smaller quantity of higher weighted profile indicators may score higher than a larger quantity of lower-weighted profile indicators.

In one example, the electronic processor 202 receives, from the computing device, an indication that the first user has stopped interacting with the computing device (for example, when the first user closes all open applications or when no input is received for a pre-determined time). The electronic processor 202, in response to receiving the indication, determines an information quality score for the probable user profile. When no profile is matched, but the probable use profile has sufficient information density, the electronic processor may determine that a new user profile should be added to the plurality of previously-generated user profiles. Accordingly, in some embodiments, the electronic processor 202 stores, in the database 106, the probable user profile when the information quality score exceeds an information density threshold and the confidence score does not exceed the confidence threshold. The information density threshold is a threshold, which, when exceeded, indicates that the probable user profile contains enough information to be stored as a new user profile. The electronic processor 202 discards the probable user profile when the information quality score does not exceed an information density threshold.

In some instances, information that is not in the active user profile is collected during the generation of the probable user profile. For example, a new set of applications may have been installed since the user last authenticated. In another example, the user's typing pattern may not have been determined before. In another example, user preferences or settings are made or chosen that differ from those in the active user profile. Accordingly, in some embodiments, the electronic processor 202 compares the probable user profile to the active user profile to determine at least one difference between the probable user profile and the active user profile, updates the active user profile based on the at least one difference, and stores, in the database 106, the updated active user profile.

Figure 4:
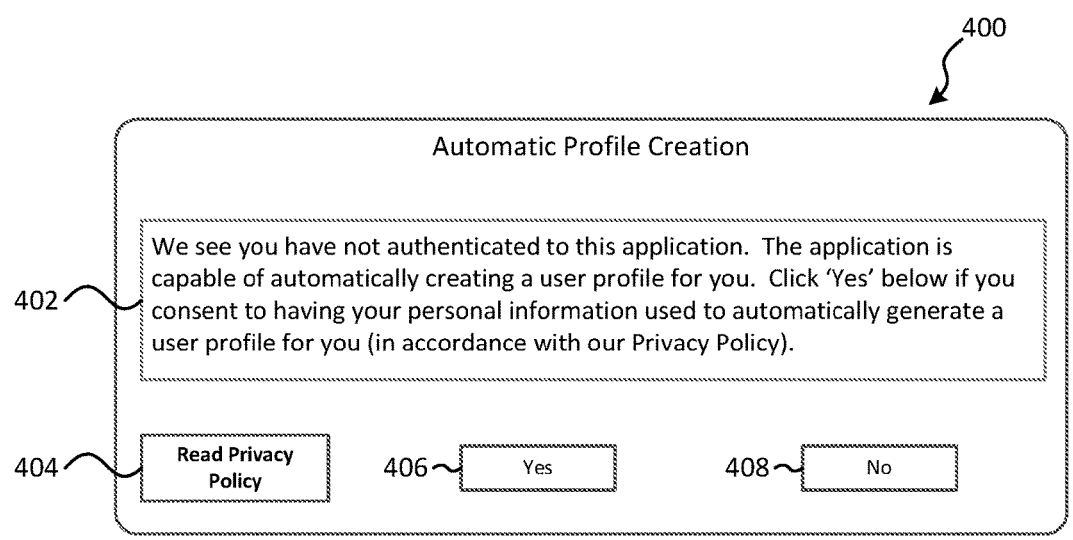
FIG. 4 illustrates a graphical user interface element for use with the system of FIG. 1 according to some embodiments of the invention.

In some embodiments, due to privacy or security considerations, the computing device 102 allows users to opt out of using the automated profile generation. For example, as illustrated in FIG. 4, the computing device 102 presents a dialog box 400. The dialog box 400 includes a message 402, which informs the user that the computing device uses automated profile generation, and asks the user to consent. The dialog box 400 includes a button 404 that when selected causes a privacy policy governing use of the computing device 102 to be presented. The dialog box 400 also includes a button 406 to consent ("Yes"), and a button 408 to deny consent ("No").

Thus, embodiments provide, among other things, systems and methods for automatic user profile generation and authentication. Various features and advantages of some embodiments are set forth in the following claims.

What is claimed is:

1. A system for automatic user profile generation and authentication, the system comprising:
a database storing user profile data for a plurality of users; and
an electronic processor communicatively coupled to the database and configured to
receive, from a computing device, a first usage indicator for a first user, the first usage indicator including at least one selected from a group consisting of a typing pattern, a language, a word usage, a document content, a touch gesture pattern, a mouse movement pattern, a document feature, and a reading speed;
receive, from the computing device, a first user identifier for the first user;
generate a probable user profile based on the first usage indicator and the first user identifier;
retrieve, from the database, a plurality of previously-generated user profiles;
determine, for each of the plurality of previously-generated user profiles, a confidence score based on the probable user profile;
receive, from the computing device, an indication that the first user has stopped interacting with the computing device;
in response to receiving the indication, determine an information quality score for the probable user profile; and
store the probable user profile in the database when none of the plurality of previously-generated user profiles has a confidence score that exceeds a confidence threshold and the information quality score exceeds an information density threshold.

2. The system of claim 1, wherein the electronic processor is further configured to
select, from the plurality of previously-generated user profiles, a first plurality of potential matches based on at least one selected from a group consisting of the first usage indicator and the first user identifier; and
store the probable user profile in the database when none of the first plurality of potential matches has a confidence score that exceeds a confidence threshold and the information quality score exceeds an information density threshold.

3. The system of claim 2, wherein the computing device is configured to make available to the first user at least one personalized resource based on the plurality of potential matches.

4. The system of claim 2, wherein the electronic processor is further configured to
receive, from the computing device, at least one selected from a group consisting of a second usage indicator and a second user identifier for a first user;
update the confidence score for each of the plurality of potential matches based on at least one selected from a group consisting of the second usage indicator and the second user identifier;
select, from the first plurality of potential matches, a second plurality of potential matches based on the updated confidence score for each of the first plurality of potential matches; and
store the probable user profile in the database when none of the second plurality of potential matches has a confidence score that exceeds a confidence threshold and the information quality score exceeds an information density threshold.

5. The system of claim 1, wherein the electronic processor is further configured to
assign a weight to at least one of the first usage indicator and the first user identifier;
determine, for each of the plurality of previously-generated user profiles, a weighted confidence score based on the confidence score and the weight; and
store the probable user profile in the database when none of the first plurality of potential matches has a weighted confidence score that exceeds a confidence threshold and the information quality score exceeds an information density threshold.

6. The system of claim 1, wherein the electronic processor is further configured to
discard the probable user profile when the information quality score does not exceed an information density threshold.

7. The system of claim 1, wherein the first user identifier is at least one selected from a group consisting of a name, an email address, a phone number, a date of birth, a location, an installed application, an interface customization, an email, a text message, a calendar entry, a contact record, a proximity to an authenticated device, a network connection, a biometric identifier, and a nearby authenticated user.

8. A method for automatic user profile generation and authentication, the method comprising:
receiving, from a computing device, a first usage indicator for a first user, the first usage indicator including at least one selected from a group consisting of a typing pattern, a language, a word usage, a document content, a touch gesture pattern, a mouse movement pattern, a document feature, and a reading speed;
receiving, from the computing device, a first user identifier for the first user;
generating, with an electronic processor, a probable user profile based on the first usage indicator and the first user identifier;
retrieving, from a database storing user profile data for a plurality of users, a plurality of previously-generated user profiles;
determining, for each of the plurality of previously-generated user profiles, a confidence score based on the probable user profile;
selecting, from the plurality of previously-generated user profiles, a first plurality of potential matches based on at least one selected from a group consisting of the first usage indicator and the first user identifier;
receiving, from the computing device, an indication that the first user has stopped interacting with the computing device;
in response to receiving the indication, determining an information quality score for the probable user profile; and
storing the probable user profile in the database when none of the first plurality of potential matches has a confidence score that exceeds a confidence threshold and the information quality score exceeds an information density threshold.

9. The method of claim 8, further comprising:
making available to the first user at least one personalized resource based on the plurality of potential matches.

10. The method of claim 8, further comprising:
receiving, from the computing device, at least one selected from a group consisting of a second usage indicator and a second user identifier for a first user;
generating, with the electronic processor, an updated confidence score for each of the plurality of potential matches based on the confidence score and at least one selected from a group consisting of the second usage indicator and the second user identifier;
selecting, from the first plurality of potential matches, a second plurality of potential matches based on the updated confidence score for each of the first plurality of potential matches; and
storing the probable user profile in the database when none of the second plurality of potential matches has a confidence score that exceeds a confidence threshold and the information quality score exceeds an information density threshold.

11. The method of claim 8, further comprising:
assigning a weight to at least one of the first usage indicator and the first user identifier;
determining, for each of the plurality of previously-generated user profiles, a weighted confidence score based on the confidence score and the weight; and
storing the probable user profile in the database when none of the first plurality of potential matches has a weighted confidence score that exceeds a confidence threshold and the information quality score exceeds an information density threshold.

12. The method of claim 8, further comprising:
discarding the probable user profile when the information quality score does not exceed an information density threshold.

13. The method of claim 8, wherein receiving the first user identifier includes receiving at least one selected from a group consisting of a name, an email address, a phone number, a date of birth, a location, an installed application, an interface customization, an email, a text message, a calendar entry, a contact record, a proximity to an authenticated device, a network connection, a biometric identifier, and a nearby authenticated user.

14. A non-transitory computer-readable medium including instructions executable by an electronic processor to perform a set of functions, the set of functions comprising:
receiving, from a computing device, a first usage indicator for a first user, the first usage indicator including at least one selected from a group consisting of a typing pattern, a language, a word usage, a document content, a touch gesture pattern, a mouse movement pattern, a document feature, and a reading speed;
receiving, from the computing device, a first user identifier for the first user;
generating, with an electronic processor, a probable user profile based on the first usage indicator and the first user identifier;
retrieving, from a database storing user profile data for a plurality of users, a plurality of previously-generated user profiles;
determining, for each of the plurality of previously-generated user profiles, a confidence score based on the probable user profile;
selecting, from the plurality of previously-generated user profiles, a first plurality of potential matches based on at least one selected from a group consisting of the first usage indicator and the first user identifier;
receiving, from the computing device, an indication that the first user has stopped interacting with the computing device;
in response to receiving the indication, determining an information quality score for the probable user profile; and
storing the probable user profile in the database when none of the first plurality of potential matches has a confidence score that exceeds a confidence threshold and the information quality score exceeds an information density threshold.

\* \* \* \* \*